March 27, 1951 D. P. REDDING 2,546,275
INSTRUMENT ADAPTED TO COMPARE HEAT AREAS
FOR DETERMINING SUBLUXATIONS
Filed Dec. 22, 1948 2 Sheets-Sheet 2

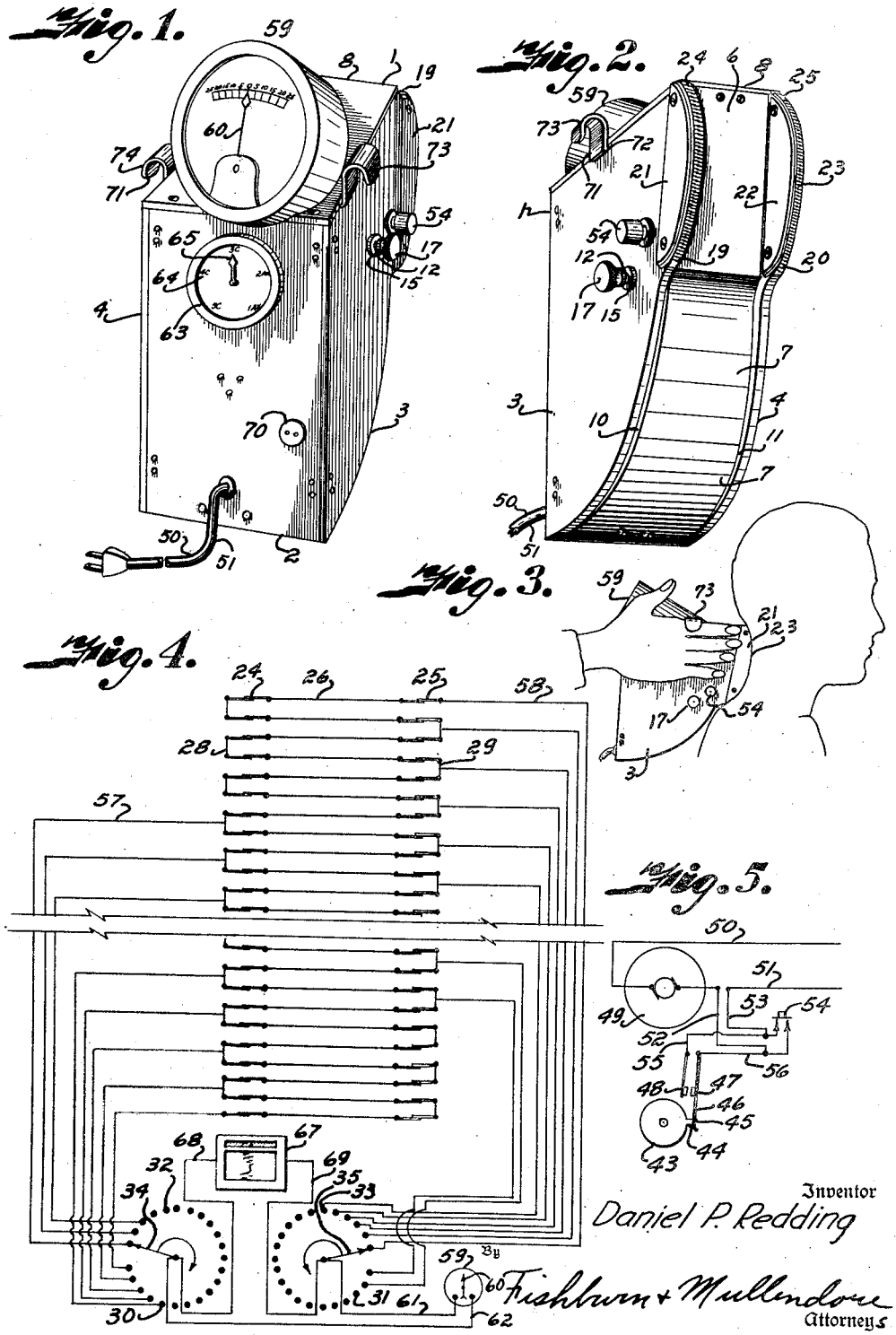

Inventor
Daniel P. Redding
By Fishburn & Mullendore
Attorneys

Patented Mar. 27, 1951

2,546,275

UNITED STATES PATENT OFFICE 2,546,275

INSTRUMENT ADAPTED TO COMPARE HEAT AREAS FOR DETERMINING SUBLUXATIONS

Daniel P. Redding, Kansas City, Mo.

Application December 22, 1948, Serial No. 66,622

12 Claims. (Cl. 128—2.1)

This invention relates to an instrument adapted to compare heat areas for determining subluxations that may occur between the fifth cervical vertebra of the neck and occiput of the skull, as well as the degree of nerve interference in terms of current flow induced responsive to differential temperatures on the respective sides of a patient's neck.

The principal object of the invention is to provide a device of this character whereby the temperature differentials along the side areas are successively and accurately indicated and/or recorded without shifting of the instrument.

Other objects of the invention are to provide the instrument with two parallel series of couples adapted to make simultaneous contact along the side areas of the neck from substantially the fifth cervical to the occiput; to provide for lateral positioning of the series of thermocouples according to the width of a patient's neck; and to provide a relatively small, compact device that is easily supported in position by the hands of the physician with the indicators thereof located in position for ready reading of the temperature differentials along the side areas as the thermocouples are successively automatically brought into circuit.

It is a further object to provide the instrument with a connection to a recording or graph device.

In accomplishing these and other objects of the invention, I have provided improved structure, the preferred forms of which are illustrated in the accompanying drawings wherein:

Fig. 1 is a perspective view of a heat comparative instrument constructed in accordance with the present invention.

Fig. 2 is a perspective view of the instrument from the opposite side.

Fig. 3 is a side elevational view showing the manner of using the instrument on a patient.

Fig. 4 is a wiring diagram of the thermocouples, control switches and connecting circuits, together with the current flow indicator and recording mechanisms.

Fig. 5 is a wiring diagram of the switch operating motor and control switches therefor.

Figure 6:
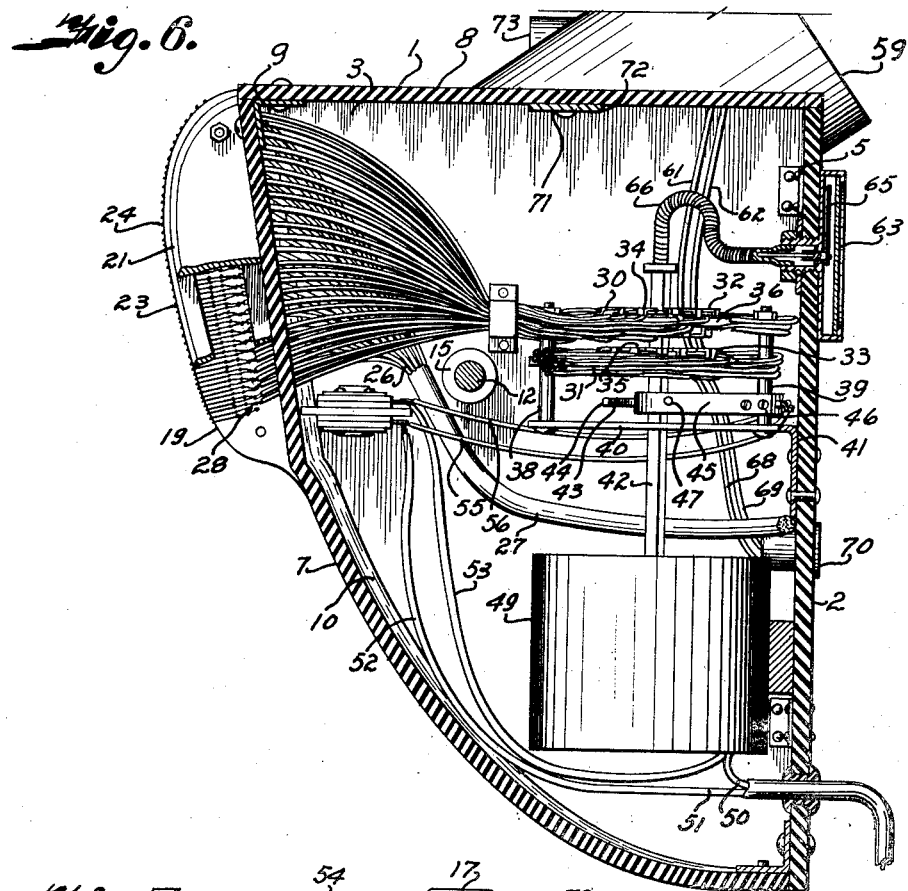
Fig. 6 is an enlarged vertical section through the instrument.

Referring more in detail to the drawings:

1 designates an instrument constructed in accordance with the present invention and especially adapted for determining subluxations between the fifth cervical vertebra of the spine and occiput of the skull, together with the degree of any nerve interference that may occur as a result of such subluxations.

The instrument includes a casing or supporting structure comprising a panel 2 having wing-like panel members 3 and 4 movably connected with sides thereof by hinge elements 5. The space 6 between the wing-like members is closed in part by a wall 7 curving upwardly and away from the lower portion of the front panel and connecting with a top panel 8 by means of an angle 9. The remaining space is closed by flexible strips 10 and 11 having side edges connected with edges of the wall 7 and with the wing-like members to permit a bellows action upon hinging movement of the wing members. The wing-like members are connected together by an adjusting shaft 12 having left hand threads 13 at one end and right hand threads 14 at the other engaging respectively in nuts 15 and 16 on the wing members 3 and 4. The ends of the shaft are provided with knobs 17 and 18 to facilitate rotation of the shaft in effecting adjustment of the spacing between the wing members for a purpose later described. Each wing member is provided directly below the top panel 9 with extensions 19 and 20 having insulators 21 and 22 provided with transverse faces 23 corresponding in contour with the contour of the areas to be tested; for example, in the form illustrated, the faces 23 curve longitudinally in correspondence with the side areas of a patient's neck extending between the fifth cervical and occiput of the skull.

Bedded transversely in the face portions of the insulators 21 and 22 are a series of thermocouples 24 and 25 respectively and which are adapted to make contact with the areas on the sides of a patient's neck. The respective thermocouples in one series are interconnected with a respective corresponding thermocouple of the other series by conductors 26 suitably contained in a cable 27 forming a loop within the casing as best shown in Figs. 6 and 7.

The thermocouples in one series are connected in pairs by conductors 28 and the couples in the other series are similarly interconnected by conductors 29 in alternate relation with the conductors 28 of the first series whereby the corresponding couples of the respective series are all connected in electrical series from one end of the shaped portions toward the other.

Current flow through the couples is controlled by switches 30 and 31, each having a circular series of contacts 32 and 33 respectively adapted to be successively engaged by contactors 34 and 35. The switches may be of any suitable construction but are shown in the drawing as comprising disks 36 and 37 formed of insulating material to which the contacts are secured and insulated one from the other. In order to accommodate the contacts on a relatively small disk, half of the contacts for one series are mounted on one side of a disk and the other half on the other side in staggered spaced relation therewith. The disks are interconnected in spaced relation by posts 38 and 39, the posts being supported by a plate 40 carried within the housing and mounted on the panel 2 by means of a bracket 41, the disk being arranged transversely and in coaxial registry to pass a shaft 42 carrying the contactors 34 and 35.

Figure 7:
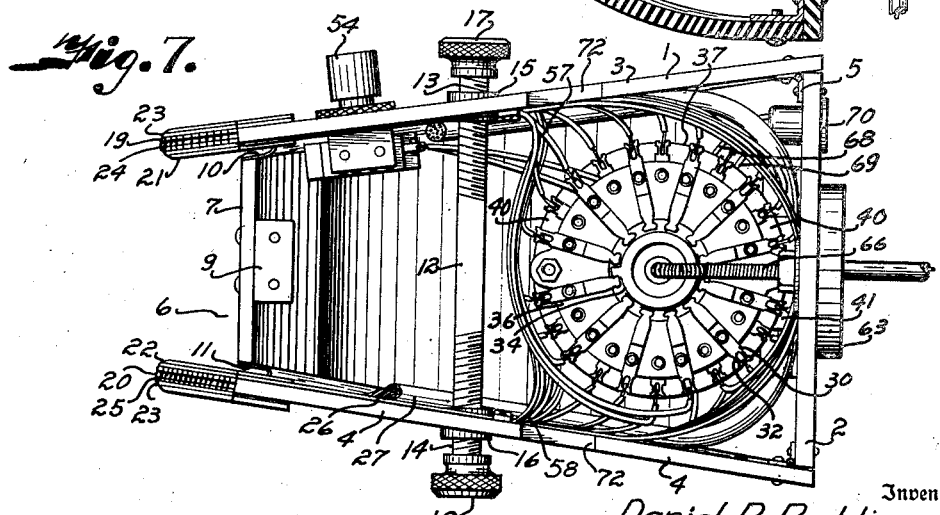
Fig. 7 is a plan view with top panel of casing removed.

Also mounted on the shaft and rotatable therewith is a cam 43 having a lobe 44 adapted to engage the contact arm 45 of a switch 46 that is mounted on the post 39 as shown in Fig. 6. The arm 45 mounts a contact 47 that is adapted to engage a complementary contact 48 of the switch to close circuit therethrough as later described. Supported in the casing below the plate 40 is an actuator 49 which may be an electrical motor unit directly connected with the shaft 42. The motor is supplied with current through conductors 50 and 51 and connected in the conductor 51 by branch conductors 52 and 53 is a manual switch 54.

Circuit to the motor is closed to start a cycle of operation or one revolution of the contactors as controlled by the cam 43 which automatically opens the motor circuit by means of the switch 46, the contacts of the switch being connected by conductors 55 and 56 and with the conductors 52 and 53.

The switch contacts 32 and 33 are respectively connected with the conductors 28 and 29 of the respective series of thermocouples by conductors 57 and 58. In order to supply ample current to operate an indicator 59 that is mounted on the top plate 8 of the casing, the thermocouples are connected by the conductors 57 and 58 in groups to form connected series of thermopiles. For example, the first contact for the switch 30 is connected with the fourth conductor 28 while the first contact of the switch 31 is connected with the first thermocouple. Thus, the first seven thermocouples of each series are connected in series with the indicator when the contactors are engaging the first of the switch contacts. The succeeding conductors 28 and 29, however, are each connected with a contact of the respective switches up to the last three connecting bars of the series of thermocouples of the series of thermocouples 25. Thus, when the contactors move to the next contacts of the switches the first thermocouples are out of circuit and seven succeeding thermocouples of each series are brought into circuit so that as the contactors continue about the contacts, the corresponding number of thermocouples are successively brought into circuit with the indicator 59 to effect movement of the pointer 60 thereof to the right or left depending upon the direction of flow of current through the thermocouples as later described. The terminals of indicator 59 are connected with the conductors 61 and 62.

In order to relate the groups of thermocouples with the neck areas, the front panel is provided with a dial 63 having designations 64 signifying the first and second axis and third, fourth and fifth cervical positions. The indicator also includes a pointer 65 that is operated by a flexible cable 66 connected with the shaft 42.

Under some conditions it may be desirable to record the current flow through the respective groups of thermocouples and to accomplish this result an electrically operated recording instrument 67 may be connected by conductors 68 and 69 with the contactors 34 and 35 through a plug connection 70 located in the front panel 2.

To facilitate holding of the instrument, each of the sides of the top panel carries a transverse strap 71 which is secured to the underside thereof and the ends project through notches 72 in the upper edges of the wing members to terminate in hooks 73 and 74, the hooks being adapted to engage over the forefingers when the instrument is carried between the hands as shown in Fig. 3.

In determining nerve condition, it is known that a disarranged vertebra interferes with nerve force that results in radiation of heat to a surrounding area and these heat areas may be determined by comparing temperatures of corresponding areas.

In using the instrument, the wing members are adjusted by turning one of the knobs 17 or 18 in one direction to effect spreading of the wings or in the opposite direction to effect drawing of the wings together so that the space therebetween conforms to the width of the patient's neck. After adjustment the instrument is suspended between the palms of the hand with the hooks 73 engaging over the forefingers as shown in Fig. 3 and the extensions moved into position to engage areas on the opposite sides of the neck. The switch 54 is then closed to energize the motor 49 which turns the shaft 42 until the lobe portion 44 of the cam 43 permits closing of the contacts 47 and 48 after which the switch 54 might be allowed to open. Upon rotation of the shaft 42, the contactors 34 and 35 move about the switch contacts, successively closing circuit through the conductors 57 and 58 so that the first or uppermost thermopile is effective. If the areas contacted are of equal temperature the flow through the thermocouple in one series is counteracted by the flow of the current through the thermocouple of the other series and the pointer 60 will remain in zero position. However, should the area on one side be of higher temperature, more current will flow through the thermocouples at that side and the magnitude will be indicated by deflection of the needle 60 to the corresponding side. Likewise, if the temperature is higher on the opposite area, the needle will be deflected in the opposite direction. Thus, if the area on one side differentiates from the temperature on the other side, the fact is readily noted.

As the contactors move off the first contacts, the first pair of thermocouples of the respective series are cut out of the circuit and the next lower pair are brought into circuit and as the contactors move about the contacts successive indications are made along the length of the entire area contacted by the respective series of thermocouples. When the contactors have completed their cycle, the high lobe portion of the cam contacts the switch arm 46 and opens the circuit through the contacts 47 and 48 suspending operation of the motor. If desired, the current flow through the thermocouples may be recorded by connecting the recording instrument 67 with the socket connection 70 through the conductors 68 and 69.

From the foregoing it is obvious that I have provided an instrument for comparing heat areas which is readily placed in position and operated to obtain accurate results since the thermocouples are automatically rendered effective along the entire areas to be explored. The operator by observing the position of the pointer 60 may note the exact position where the high temperature differentials occur. With this information, the patient may be treated in accordance with usual chiropractic methods.

What I claim and desire to secure by Letters Patent is:

1. An instrument of the character described including a supporting structure, two series of thermopiles on the supporting structure in laterally spaced relation to engage respectively the side areas of the neck of a patient substantially between the fifth cervical vertebra and occiput of the skull, a directional and amplitude current flow indicator, means connecting thermopiles of one series in electrical connection with corresponding thermopiles of the other series, and means for progressively closing circuit through the corresponding thermopiles of the two series and said indicator to render the indicator effective in indicating magnitude and directional flow of current through the thermopiles as they are connected in circuit with the indicating means.

2. An instrument of the character described including a supporting structure, two series of thermopiles on the supporting structure in laterally spaced relation to engage respectively the side areas of the neck of a patient substantially between the fifth cervical vertebra and occiput of the skull, a directional and amplitude current flow indicator, means connecting thermopiles of one series in electrical connection with corresponding thermopiles of the other series, means for progressively closing circuit through the corresponding thermopiles of the two series and said indicator to render the indicator effective in indicating magnitude and directional flow of current through the thermopiles as they are connected in circuit with the indicating means, and a position indicator in operative connection with the circuit closing means for indicating the effective thermopiles relatively to said areas.

3. An instrument of the character described including a supporting structure, a pair of thermocouple series carried by the supporting structure in laterally spaced relation to engage respectively the side areas of the neck substantially between the fifth cervical vertebra and occiput of the skull, means connecting thermocouples in one series in electric series with corresponding couples in the other series to form a series of thermopiles, switches for the respective series of thermocouples and each having a contact connected with terminals of the respective thermopiles and having contactors adapted to move over the contacts, an actuator, means connecting the actuator with the contactors to move the contactors in synchronism for progressively closing circuit through the respective thermopiles, a current indicator connected in series with the respective contactors for indicating magnitude and directional flow of current to the thermopiles, a position indicator having indicating means corresponding with corresponding thermopiles, and means connecting the position indicator for movement with the contactors for effecting indication of the thermopile in circuit with the first-named indicator.

4. An instrument of the character described including a supporting structure, a pair of thermocouple series carried by the supporting structure in laterally spaced relation to engage respectively the side areas of the neck substantially between the fifth cervical vertebra and occiput of the skull, means connecting thermocouples of one series in electric series with corresponding couples in the other series, switches for the respective series of thermocouples and having contacts connected with terminals of the respective thermocouples and having contactors adapted to move over the contacts, an actuator, means connecting the actuator with the contactors to move the contactors in synchronism for progressively closing circuit through corresponding thermocouples, and a current indicator connected in series with the respective contactors for indicating magnitude and directional flow of current through the thermocouples.

5. An instrument of the character described including a supporting structure, a pair of thermocouple series carried by the supporting structure in laterally spaced relation to engage respectively the side areas of the neck substantially between the fifth cervical vertebra and occiput of the skull, means connecting thermocouples of one series in electric series with corresponding couples in the other series, switches for the respective series of thermocouples and having a contact connected with terminals of the respective thermocouples and having contactors adapted to move over the contacts, an actuator, means connecting the actuator with the contactors to move the contactors in synchronism for progressively closing circuit through corresponding thermocouples, a current indicator connected in series with the respective contactors for indicating magnitude in directional flow of current through the thermocouple circuits, a position indicator, and means connecting the position indicator for movement with the contactors for indicating the effective thermocouples which are in circuit with the first-named indicator.

6. An instrument of the character described including a supporting structure, a pair of thermocouple series carried by the supporting structure in laterally spaced relation, means connecting thermocouples of one series in electric series with corresponding couples in the other series to form a series of thermopiles, switches for the respective series of thermocouples and each having a contact connected with terminals of the respective thermocouples and having contactors adapted to move over the contacts, an actuator, means connecting the actuator with the contactors to move the contactors in synchronism for progressively closing circuit through the respective thermopiles, and recording means connected with the contactors for recording amplitude of current flow through the respective corresponding thermopiles.

7. An instrument of the character described including a support, a pair of members having swinging movement on the support toward and away from each other, said members having portions shaped to conform to side areas of the neck substantially between the fifth cervical vertebra and the occiput of the skull, a series of thermocouples arranged along each shaped portion and adapted to contact said side areas of the neck when the instrument is in use, means interconnecting the members for adjusting the shaped portions in accordance with the width of the neck, means connecting thermocouples of one series in electric series with corresponding couples in the other series to form thermopiles in the respective series, a switch on said support for each series of thermocouples and having contacts connected with terminals of the interconnected thermocouples and having a contactor adapted to move over the contacts, an actuator on the support, means connecting the actuator with the contactors of the switches to move the contactors in synchronism for progressively closing circuit through the respective thermopiles, a current indicator carried on the support and connected in series with the contactors of the switches for indicating magnitude and directional flow of current through the thermopiles, a position indicator mounted on the support and having indicating means, and means connecting the indicating means for movement with the contactors for indicating position of the thermopiles as they come into circuit with the first-named indicator.

8. An instrument of the character described including a support, a pair of wing-like members having swinging movement toward and away from each other on the support, said wing-like members having shaped portions conforming with side areas of the neck substantially between the fifth cervical vertebra and the occiput of the skull, a series of thermocouples arranged along each shaped portion and adapted to contact said side areas of the neck when the instrument is in use, means interconnecting the wing-like members for adjusting shaped portions in accordance with the width of the neck, means connecting thermocouples of one series in electric series with corresponding couples in the other series to form thermopiles, switches for the respective series of thermocouples and each having a contact connected with terminals of the interconnected thermocouples and having contactors adapted to move over the contacts, an actuator, means connecting the actuator with the contactors to move the contactors in synchronism for progressively closing circuit through the respective thermopiles, and an electrically operated recorder connected with the contactors for recording magnitude and directional flow of current through the thermopiles.

9. An instrument of the character described including a supporting structure, a pair of thermocouples series carried by the supporting structure in laterally spaced relation to engage respectively the side areas of the neck substantially between the fifth cervical vertebra and occiput of the skull, means connecting thermocouples in one series in electric series with corresponding couples in the other series to form a series of thermopiles, switches for the respective series of thermocouples and each having a contact connected with terminals of the respective thermopiles and having contactors adapted to move over the contacts, an electric motor, means connecting the electric motor in driving relation with the contactors to move the contactors in synchronism over the contacts of the respective switches, an electric circuit supplying current to the motor, a manual switch connected in said circuit for closing the circuit to control operation of the motor, a switch in said motor circuit, and means movable with the contactors for actuating the last-named switch to automatically open the motor circuit when the contactors have completed a traverse of said contacts.

10. An instrument for determining subluxations between the fifth cervical and occiput of a patient's spine including a pair of wing-like members having shaped portions corresponding with contour of the patient's neck substantially between said fifth cervical and the occiput, said members having registering openings provided with right and left threads respectively, a shaft having right and left threaded ends engaged in said openings, knobs on ends of the shaft to rotate said shaft and moving said wing-like members to and from each other to position said shaped portions relatively to the width of the patient's neck, thermocouples carried on said shaped portions of the wing-like members, and an indicator having electrical connections with the thermocouples for indicating differential temperatures of said side areas in terms of current flow through the thermocouples contacting said areas.

11. An apparatus for locating subluxations that may exist between the fifth cervical vertebra and occiput of a patient's spine including a thermocouple support having laterally spaced elongated faces arranged to extend along the respective sides of the patient's spine and substantially corresponding to the curvature of the neck between the fifth cervical vertebra and occiput, a series of thermocouples carried by each support transversely of said faces and having connection in related groups to form thermopiles adapted to contact substantially simultaneously the entire area at the sides of the cervicals between the fifth cervical vertebra and occiput to effect current flow through the thermopiles responsive to differential temperature of the contacted areas, means for establishing current flow through the thermopiles in successive order to render the thermopiles successively effective from one end of said areas to the other, and an indicator connected with said means to indicate differential temperatures of the respective areas in terms of said current flow through the thermopiles as the thermopiles are rendered successively effective.

12. An apparatus for locating subluxations that may exist between the fifth cervical vertebra and occiput of a patient's spine including a thermocouple support having laterally spaced elongated faces arranged to extend along the respective sides of the patient's spine and substantially corresponding to the curvature of the neck between the fifth cervical vertebra and occiput, a series of thermocouples carried by each support transversely of said faces and having connection in related groups to form thermopiles adapted to contact substantially simultaneously the entire area at the sides of the cervicals between the fifth cervical vertebra and occiput to effect current flow through the thermopiles responsive to differential temperature of the contacted areas, means for establishing current flow through the thermopiles in successive order to render the thermopiles successively effective from one end of said areas to the other, an indicator connected with said means to indicate differential temperatures of the respective areas in terms of said current flow through the thermopiles as the thermopiles are rendered successively effective, and a recorder actuated by current flow for recording differential temperatures of said areas in contact by the respective thermopiles as the thermopiles are rendered successively effective.

DANIEL P. REDDING.

REFERENCES CITED

The following references are of record in the file of this patent:

UNITED STATES PATENTS

| Number | Name | Date |
| --- | --- | --- |
| 1,552,284 | Evins | Sept. 1, 1925 |
| 1,610,271 | Evins | Dec. 14, 1926 |
| 1,648,939 | Evins | Nov. 15, 1927 |
| 1,648,942 | Hayman | Nov. 15, 1927 |
| 1,942,516 | Noyes, Jr. | Jan. 9, 1934 |